United States Patent [19]
Campbell, Jr.

[11] 4,015,260
[45] Mar. 29, 1977

[54] DIGITAL MTI RADAR
[75] Inventor: Ronald B. Campbell, Jr., Sudbury, Mass.
[73] Assignee: Raytheon Company, Lexington, Mass.
[22] Filed: Nov. 2, 1970
[21] Appl. No.: 85,941
[52] U.S. Cl. .............................. 343/7.7; 343/5 DP
[51] Int. Cl.² ........................................ G01S 9/42
[58] Field of Search .................... 343/5 DP, 7.7
[56] References Cited
UNITED STATES PATENTS 3,066,289  11/1962  Elbinger ..................... 343/7.7
3,343,162  9/1967  Evans ......................... 343/7.7
3,422,435  1/1969  Cragon et al. .............. 343/5 DP
3,617,719  11/1971  Wong et al. ............... 343/5 DP X Primary Examiner—Malcolm F. Hubler
Attorney, Agent, or Firm—Richard M. Sharkansky; Philip J. McFarland; Joseph D. Pannone

[57] ABSTRACT

A digital MTI radar wherein, after an initial period, differences between the composite video signal of a present range sweep and a prediction of the composite video signal of such range sweep are digitized by an analog-to-digital converter.

5 Claims, 2 Drawing Figures

INVENTOR
RONALD B. CAMPBELL, JR.

DIGITAL MTI RADAR

BACKGROUND OF THE INVENTION

This invention relates generally to digital MTI radar systems and particularly to the digital video cancellation arrangement therein.

It is known in the art that, in MTI radar systems of the type contemplated herein, a reference signal is generated within the receiver of such system, such signal being coherent (that is, in phase) with each pulse in a train of successively transmitted pulses of radio frequency energy. A portion of the received energy resulting from each transmitted pulse is processed with such reference signal to produce a corresponding number of video signals during each range sweep. For convenience, however, the video signals so produced may be considered as a composite video signal made up of different portions, depending on whether the targets are moving or not. The portions of the composite video signal produced by reflections from stationary targets are in constant phase relationship with the reference signal between successive range sweeps. The portions of the composite video signal produced by reflections from moving targets vary in phase relationship with the reference signal between successive sweeps. Therefore, by comparing the composite video signal of a current range sweep with the composite video signal of at least one previous range sweep, cancellation of the portions of the composite video signal resulting from stationary targets may be effected.

The cancelling process referred to above is performed in digital MTI radar systems by a digital canceller. When such a canceller is employed, the composite video signal during each range sweep is digitized by an analog-to-digital (A/D) converter. Therefore, the A/D converter used in present digital MTI radar systems must accommodate the wide dynamic range of the composite video signal.

Various types of A/D converters are described in Skolnik's *"Radar Handbook"* published by McGraw-Hill, Inc., N.Y., N.Y. (1970) pp. 5–46 to 5–49. As there shown, the type of A/D converter selected for use in any application requires a tradeoff between conversion rate and complexity. Thus, the simultaneous A/D converter operates at the greatest speed but is most complex, requiring $2^{N-1}$ discrete comparators and associated comparator components for N bit accuracy. Sequential A/D converters, for example, require fewer discrete components than the simultaneous A/D converter; however, the speed of the sequential converter is much lower than the simultaneous A/D converter.

SUMMARY OF THE INVENTION

It is, therefore, an object of the invention to provide a high speed, high resolution digital video cancellation arrangement for use in MTI radar systems.

It is another object of the invention to provide, in an MTI radar system, a higher speed digital video cancellation arrangement with fewer discrete components than are presently known.

These and other objects of the invention are generally attained by combining, in the receiver of an MTI radar system, the functions of the A/D converter and the digital canceller in a manner such that the dynamic range of the analog signal to be digitized is smaller than the dynamic range of the analog signal normally digitized with conventional arrangements. In particular, after digitizing the composite video signal of the first few such signals, only differences between the composite video signal of the incoming range sweep and the predicted value of such composite video signal are digitized. To effect digitizing in such a way in a first order cancellation arrangement, repetitively operative means are provided: (1) to convert the composite video signal on a first range sweep to a corresponding digital signal; (2) to digitally process such converted digital signal in a manner so as to form a digital signal representing the predicted video signal for the next composite video signal and to store such predicted video signal; (3) to reconvert such stored predicted video signal into analog form during the next following range sweep and to subtract such reconverted video signal from the composite video signal then being generated to form a difference signal; and (4) to modify the stored predicted video signal in accordance with a digital signal corresponding to such difference signal. In a higher order cancellation arrangement the repetitively operative means are generally the same as in a first order arrangement except that the digital processing means includes appropriate circuitry to permit formation of the difference signal from the composite video signal of more than two successive range sweeps.

BRIEF DESCRIPTION OF THE DRAWINGS

Other objects and many of the attendant advantages of the invention will be readily appreciated as the same become better understood by reference to the following detailed description when considered in connection with the accompanying drawings wherein.

DESCRIPTION OF THE PREFERRED EMBODIMENT

Figures 1, 2:
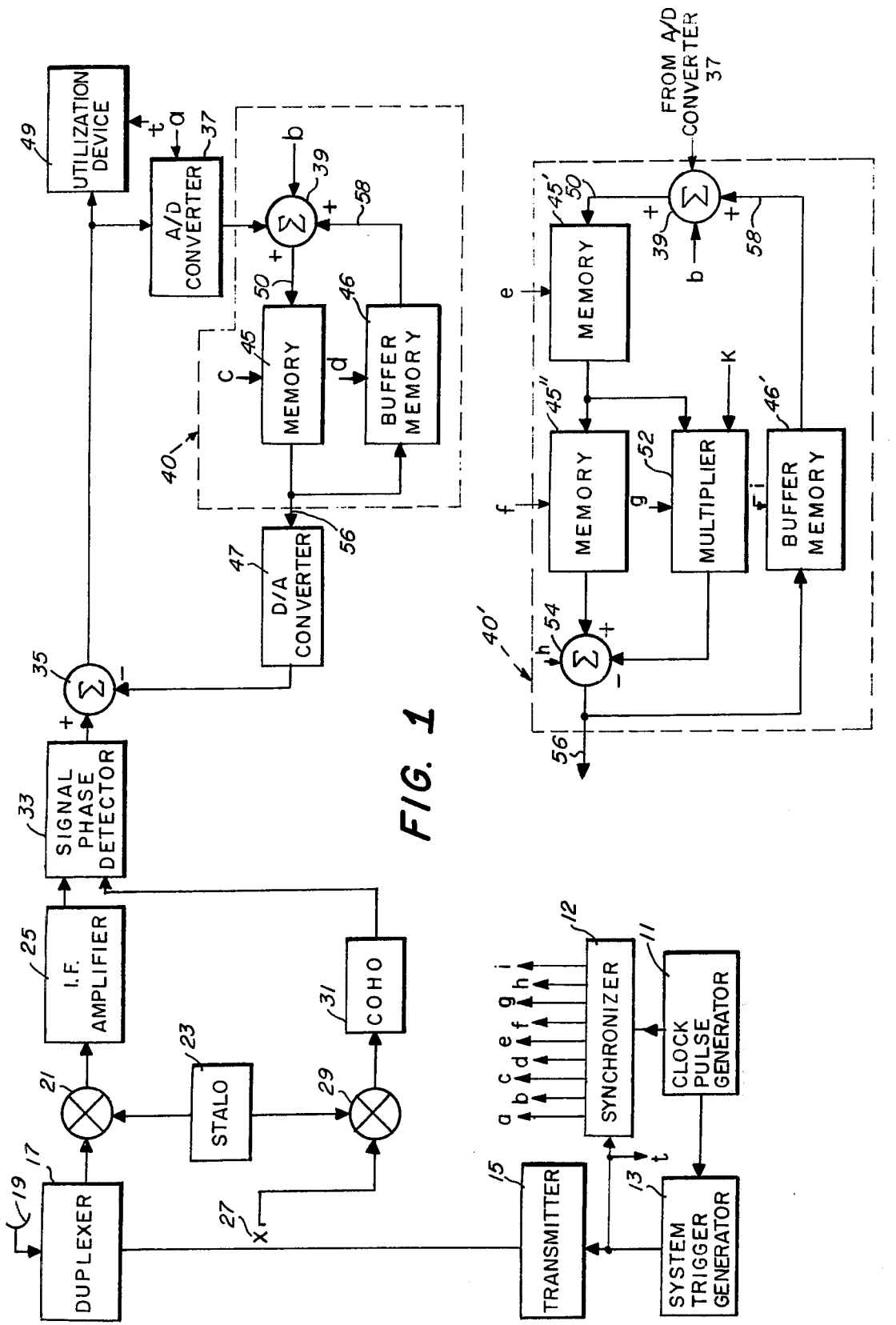
FIG. 1 shows a digital MTI radar employing the invention when a first order cencellation arrangement is desired for stationary targets; and, FIG. 2 shows an alternative form of the predictor shown in FIG. 1 when a second order cancellation arrangement is desired.

Referring now to FIG. 1, it should be noted first that, for convenience, a coherent pulse Doppler radar has been selected to illustrate how this invention may be applied. Thus, the illustrated system includes a clock pulse generator 11, a synchronizer 12, a system trigger generator 13, a transmitter 15, a duplexer 17 and an antenna 19, each of which is conventional in construction and operation to produce, periodically, a directional beam of electromagnetic energy (not shown) to illuminate targets (not shown) within such beam. Echo signals (not shown) from any and all targets are received by the antenna 19, and, after passing through the duplexer 17, are heterodyned in a signal mixer 21 with a signal from a stable local oscillator, stalo 23. The resulting intermediate frequency signals are passed through an I.F. amplifier 25 (which may limit such signals in a conventional manner). A portion of the electromagnetic energy out of the transmitter 15 is removed, by means of a directional coupler 27, and heterodyned with the signal from the stalo 23 in a mixer 29. The resulting signal, after appropriate gating and filtering (not shown), is applied to a coherence oscillator coho 31. The output signal from the latter element serves as a reference signal, and as is well known, is then locked in phase with each transmitted pulse.

It is noted here that synchronizer 12, of conventional design, is used to provide gated clock pulses to appear on lines a–i. Such gated clock pulses are required as with any digital processing system to synchronize the operation of digital devices such as digital memories, digital adders, digital multipliers and A/D converters with functions of the transmitted signal and to compensate for system processing delays.

The signals out of the I.F. amplifier 25 are impressed on input terminals (not numbered) of a signal phase detector 33. The bipolar signals from the signal phase detector 33 during each range sweep make up the composite video signal from both stationary and moving targets. This composite video signal is passed to an analog differencing network 35. The resulting signals produced by analog differencing network 35 are digitized by an A/D converter 37, here a simultaneous A/D converter, such converter being synchronized with the gated clock pulse on line a. The complexity of A/D converter 37 depends upon the significant bits desired in the digital numbers to be processed, i.e. on the resolution desired. The digitized signal produced by A/D converter 37 is applied to digital adder 39 of predictor 40, such adder being synchronized with the gated clock pulse on line b. Here predictor 40 is employed in a first order canceller arrangement, that is, as will be fully described later, the composite video signal of the present range sweep is predicted to be the same as the composite video signal of the previous range sweep. The signals produced by digital adder 39 are stored into digital memory 45, such memory here being synchronized with the gated clock pulse on line c and such memory being of sufficient capacity to store the data generated by a single sweep. The signals read out of digital memory 45 are transmitted to buffer memory 46, such memory being synchronized with the gated clock pulse on line d, and to D/A converter 47. The signals produced by D/A converter 47 are applied to analog differencing network 35. The signals read out of buffer memory 46 are applied to digital adder 39.

In operation, the composite video signal resulting from the processing of echo signals during the first range sweep is digitized by A/D converter 37 and stored in digital memory 45. During the second range sweep the signal stored in digital memory 45 is read out of such memory, then: (1) stored in buffer memory 46, and (2) converted to a corresponding analog signal by D/A converter 47. The synchronizer 12 is designed such that the signal produced by D/A converter 47 is subtracted, in the analog differencing circuit 35, from the composite video signal resulting from such second sweep and then appearing at the output of the signal phase detector 33. The difference signal, $\Delta V$, out of the analog differencing network 35 is the same as that produced by a conventional analog first order MTI canceller. That is, since the second range sweep is assumed to be identical with the first range sweep, the portions of the composite video signal caused by reflections from stationary targets are cancelled and only the portions resulting from moving targets are present. The difference signal, $\Delta V$, is applied to analog utilization device and digitized by A/D converter 37. The analog utilization device 49, for example, may be a conventional indicator to display uncancelled signals, i.e. signals from moving targets.

It is here now noted that A/D converter 37 operates hereafter only on difference signals. It follows, therefore, that because the dynamic range of such difference signals is obviously generally less than the dynamic range of the composite video signal on any range sweep, the order of bit size required for this converter is significantly smaller than would be required in digitizing any composite video signal. The synchronizer 12 is designed such that the signal $\Delta V$ is, after digitizing by A/D converter 37, added to the digital signal being read out of buffer memory 46, the latter signal being the digitized video signal of the first transmitted pulse. The resulting signal, a signal which is representative of the composite signal of the second range sweep, is stored in memory 45 of predictor 40. Such stored signal is, therefore, the prediction of the composite video signal for the third sweep and is available for conversion to an analog signal and cancellation with the video signal resulting from reflections associated with a third transmitted pulse. The above operation continues for each transmitted pulse. It is first noted that A/D converter 37 may saturate during the processing of the first few pulses, but, within a certain time period, the described arrangement becomes saturated. It is also noted that the system described in reference above provides a first order cancellation, that is, the incoming composite range sweep portion resulting from stationary targets is assumed to be equal to the corresponding portions of the previous composite range sweep.

FIG. 2 shows a predictor 40' for use in a second order cancellation arrangement. In such arrangement two previous range sweeps are used to predict the incoming range sweep. Here the predictor uses a linear extrapolation of the two preceding sweeps to predict the present sweep, that is, $$S_3(t) = 2S_2(t) - S_1(t)$$

where $S_3(t) =$ composite video signal of the present incoming range sweep
$S_2(t) =$ composite video signal of the range sweep prior to $S_3(t)$
$S_1(t) =$ composite video signal of the range sweep prior to $S_2(t)$ In such second order cancellation arrangement, the signal produced by digital adder 39 on line 50 of FIG. 1 also appears on line 50 of FIG. 2 and is applied to digital memory 45', such memory being synchronized with the gated clock pulse on line e. The signals read out of digital memory 45' are transmitted to both digital memory 45'' and digital multiplier 52, digital memory 45'' and multiplier 52 being synchronized with the gated clock pulses on lines f and g, respectively. The signals read out of digital memory 45'' and digital multiplier 52 are combined in digital adder 54, such adder being synchronized with the gated clock pulse on line h. The signal produced by digital adder 54 on line 56 is transmitted to D/A converter 47 as shown in FIG. 1 and also to a buffer memory 46', such memory being synchronized with the gated clock pulse on line i. The signal read out of buffer memory 46' on line 58 is transmitted to digital adder 39 as shown in FIG. 1.

In operation, and in reference to FIG. 1 and FIG. 2, the composite video signal produced by signal phase detector 33 as a result of echo signals during the first range sweep (such signal being represented by $S_1(t)$ is digitized by A/D converter 37 and stored into digital memory 45' of predictor 40'.

During the second range sweep the signal stored in digital memory 45' is read out of such memory, then: (1) stored in digital memory 45'', and (2) multiplied in digital multiplier 52 by a factor K, here 2. The signal produced by multiplier 52, such signal being represented by $2S_1(t)$, is: (1) converted to a corresponding analog signal by D/A converter 47; and (2) stored in buffer memory 46'. The synchronizer 12 is designed such that the signal produced during the second range sweep by D/A converter 47 (FIG. 1) is, therefore, subtracted from the composite video signal (represented by $S_2(t)$) during the second range sweep in analog differencing network 35. The synchronizer 12 is designed such that the resulting signal produced by the differencing network 35 during the second range sweep is, after being digitized by A/D converter 37, added to the digital signal being read out of buffer memory 46', the resulting signal representing $S_2(t)$ being stored into digital memory 45'.

During the third range sweep, the signals stored in digital memories 45' and 45'', i.e. $S_2(t)$ and $S_1(t)$, are read out. The synchronizer 12 is designed such that the signal from digital memory 45' is then multiplied in digital multiplier 52 by a factor K, here 2, to form a signal representing $2S_2(t)$. Such multiplied signal and the signal out of the digital memory 45'' are combined in digital adder 54 to form the signal $2S_2(t) - S_1(t)$, such signal being the predicted value of $S_3(t)$ and being available for cancellation with $S_3(t)$. The signal produced by digital adder 54, that is, the predicted value of $S_3(t)$, is: (1) converted to a corresponding analog signal by D/A converter 47 and (2) stored in buffer memory 46'. The synchronizer 12 is designed such that the signal produced by D/A converter 47, that is, the predicted value of $S_3(t)$, is subtracted from the composite video signal, $S_3(t)$, during the third range sweep in analog differencing network 35. The signal produced by differencing network 35, i.e. $S_3(t) - 2S_2(t) + S_1(t)$, is, after being digitized by A/D converter 37, added to the signal being read out of buffer memory 46' to form the signal $S_3(t)$. The resulting signal, $S_3(t)$, is then stored into digital memory 45'.

While the invention has been illustrated and described for a first and second order cancellation arrangement, it will be obvious to those of skill in the radar art that many changes in the disclosed embodiment may be made without departing from the inventive concepts. For example, cancellation arrangements of the illustrated orders or third order or higher orders may be used. Further, operation of the illustrated second order predictor may be modified to render it adaptive by providing any convenient means for changing the multiplier "K" in accordance with the observed performance of the radar system as when the system is used for cancellation of other than stationary targets. Still further, the illustrated first order predictor may be modified to include a multiplier to make that predictor adaptive. It is felt, therefore, that this invention should not be restricted to the proposed embodiments, but rather should be limited only by the spirit and scope of the following claims.

What is claimed is:

1. In an MTI radar system wherein an analog difference signal, such signal corresponding to the difference between a composite video signal during a range sweep and a predicted video signal for such range sweep, is digitized to form a corresponding digital difference signal, the improvement comprising:
    a. predictor means, responsive to a digital input signal, for producing a predicted digital signal;
    b. a digital-to-analog converter, responsive to the predicted digital signal, for producing the predicted video signal;
    c. a differencing network, responsive to the predicted video signal and the composite video signal, for forming an analog difference signal; and,
    d. an analog-to-digital converter, responsive to the analog difference signal, for forming said digital input signal.

2. In an MTI radar system wherein an analog difference signal, such signal corresponding to the difference between a composite video signal during a range sweep and a predicted video signal for such range sweep, is digitized to form a corresponding digital difference signal, the improvement as recited in claim 1, wherein the predicted digital signal produced by the predictor means is a digital signal representing the composite video signal during the preceding range sweep.

3. In an MTI radar system wherein an analog difference signal, such signal corresponding to the difference between a composite video signal during a range sweep and a predicted video signal for such range sweep, is digitized to form a corresponding digital difference signal, the improvement as recited in claim 1, wherein the predicted digital signal produced by the predictor means is a digital signal representing the difference between twice the composite video signal during the immediately preceding range sweep and the composite video signal during the range sweep prior to such preceding range sweep.

4. In an MTI radar system wherein an analog difference signal, such signal corresponding to the difference between a composite video signal during a range sweep and a predicted video signal for such range sweep, is digitized to form a corresponding digital difference signal, the improvement as recited in claim 1, including utilization means to observe the analog difference signal; and means, operative in accordance with the utilization means, for varying the predicted digital signal produced by the predictor means.

5. In an MTI radar system, the combination comprising:
    a. differencing means for producing an analog difference signal corresponding to the difference between a composite video signal produced during a range sweep and an analog signal representative of a prediction of such composite video signal;
    b. an analog-to-digital converter for digitizing such analog difference signal;
    c. predicter means, responsive to the digital signal produced by the analog-to-digital converter, for producing a digital signal representative of a prediction of the composite video signal for a succeeding range sweep; and
    d. a digital-to-analog converter for converting the digital signal produced by the predictor means into the analog signal, such analog signal being the analog signal representative of a prediction of the composite video signal which is coupled to the differencing means.

* * * * *

UNITED STATES PATENT OFFICE
CERTIFICATE OF CORRECTION

Patent No. 4,015,260          Dated March 29, 1977

Inventor(s)      Ronald B. Campbell, Jr.

It is certified that error appears in the above-identified patent and that said Letters Patent are hereby corrected as shown below:

In the specification:

Column 4, line 19, delete "saturated" and insert therefor -- unsaturated --.

Signed and Sealed this

Fourth Day of October 1977

[SEAL]

*Attest:*

RUTH C. MASON          LUTRELLE F. PARKER
*Attesting Officer*      *Acting Commissioner of Patents and Trademarks*